United States Patent

Hayashi et al.

[11] Patent Number: 6,150,741
[45] Date of Patent: Nov. 21, 2000

[54] ALTERNATING CURRENT GENERATOR FOR VEHICLES HAVING IMPROVED OUTPUT TERMINAL FIXING STRUCTURE

[75] Inventors: Yoshinori Hayashi, Kariya; Hitoshi Irie, Nagoya, both of Japan

[73] Assignee: Denso Corporation, Kariya, Japan

[21] Appl. No.: 09/385,054

[22] Filed: Aug. 30, 1999

[30] Foreign Application Priority Data

Dec. 25, 1998 [JP] Japan .................................. 10-369081

[51] Int. Cl.[7] .................................................. H02K 11/00
[52] U.S. Cl. ........................... 310/68 D; 310/71; 439/738
[58] Field of Search .................................. 310/68 D, 71, 310/68 R; 439/738

[56] References Cited

U.S. PATENT DOCUMENTS

| | | | |
|---|---|---|---|
| 3,548,226 | 12/1970 | Sato | 310/68 D |
| 3,895,247 | 7/1975 | Iwata et al. | 310/68 D |
| 3,974,407 | 8/1976 | Dochterman | 310/71 |
| 4,362,351 | 12/1982 | Wible | 439/738 |
| 4,705,983 | 11/1987 | Franz et al. | 310/68 D |
| 5,095,235 | 3/1992 | Kitamura | 310/68 D |
| 5,229,675 | 7/1993 | Gotoh | 310/71 |
| 5,315,195 | 5/1994 | Bradfield et al. | 310/89 |
| 5,453,648 | 9/1995 | Bradfield | 310/71 |

FOREIGN PATENT DOCUMENTS

| | | |
|---|---|---|
| 61-149952 | 9/1986 | Japan . |
| 4-165949 | 6/1992 | Japan . |
| 9-107654 | 4/1997 | Japan . |

*Primary Examiner*—Nestor Ramirez
*Assistant Examiner*—Joseph Waks
*Attorney, Agent, or Firm*—Pillsbury Madison & Sutro LLP

[57] ABSTRACT

In an alternating current generator for vehicles, an output terminal of a rectifier circuit is tightly fixed to a positive-polarity side heat radiation fin by tightening a nut. A resin bushing is fitted around the nut to insulate electrically the output terminal. The bushing has a flange on its outer peripheral surface. A rear cover made of resin is attached to cover the flange, so that the rear cover restrains the bushing from moving along and turning around the output terminal.

11 Claims, 3 Drawing Sheets

ALTERNATING CURRENT GENERATOR FOR VEHICLES HAVING IMPROVED OUTPUT TERMINAL FIXING STRUCTURE

CROSS REFERENCE TO RELATED APPLICATION

This application relates to and incorporates herein by reference Japanese Patent Application No. 10-369081 filed on Dec. 25, 1998.

BACKGROUND OF THE INVENTION

1. Field of the Invention

The present invention relates to an alternating current generator for vehicles, which is to be mounted on passenger cars or trucks.

2. Related Art

In conventional alternating current generators (alternators), alternator output power is taken out through an output terminal provided in a rectifier circuit. In the alternator disclosed in JP-A-9-107654, a resin bushing is fitted around an output terminal for electrical insulation. The end part of an electrical power lead is connected to the output terminal by a pair of nuts, one of which is used to fix tightly the bushing to the output terminal by pressing. As the bushing tends to contract in a direction of pressing, the tightening nut is likely to be loosened.

In another alternator disclosed in JP-A-4-165949, the positive pole side heat sink (heat radiation fin) of a rectifier circuit is provided to protrude through an output terminal so that a nut fitted around the output terminal contacts directly the end part of the protrusion of the heat sink. A resin bushing is fitted to surround the protrusion from the outer periphery side. The bushing cannot be fixed with ease in this structure.

SUMMARY OF THE INVENTION

It is therefore an object of the present invention to provide an alternating current generator, in which a protective member can be fixed with ease.

According to the present invention, a protective member such as a resin bushing fitted around an output terminal of a rectifier circuit is held fixedly by positioning a rear cover, which covers the rectifier circuit, in contact with a part of the output terminal.

Preferably, an electric power output lead is attached to the output terminal by tightening a fixing member such as a nut without contacting the protective member, so that the protective member is not's pressed by the fixing member. Thus, loosening of the fixing member is not caused even when the protective member contracts.

Preferably, the rear cover has a part, which engages a part of the protective member to restrain the protective member from moving along and/or turning around the output terminal.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
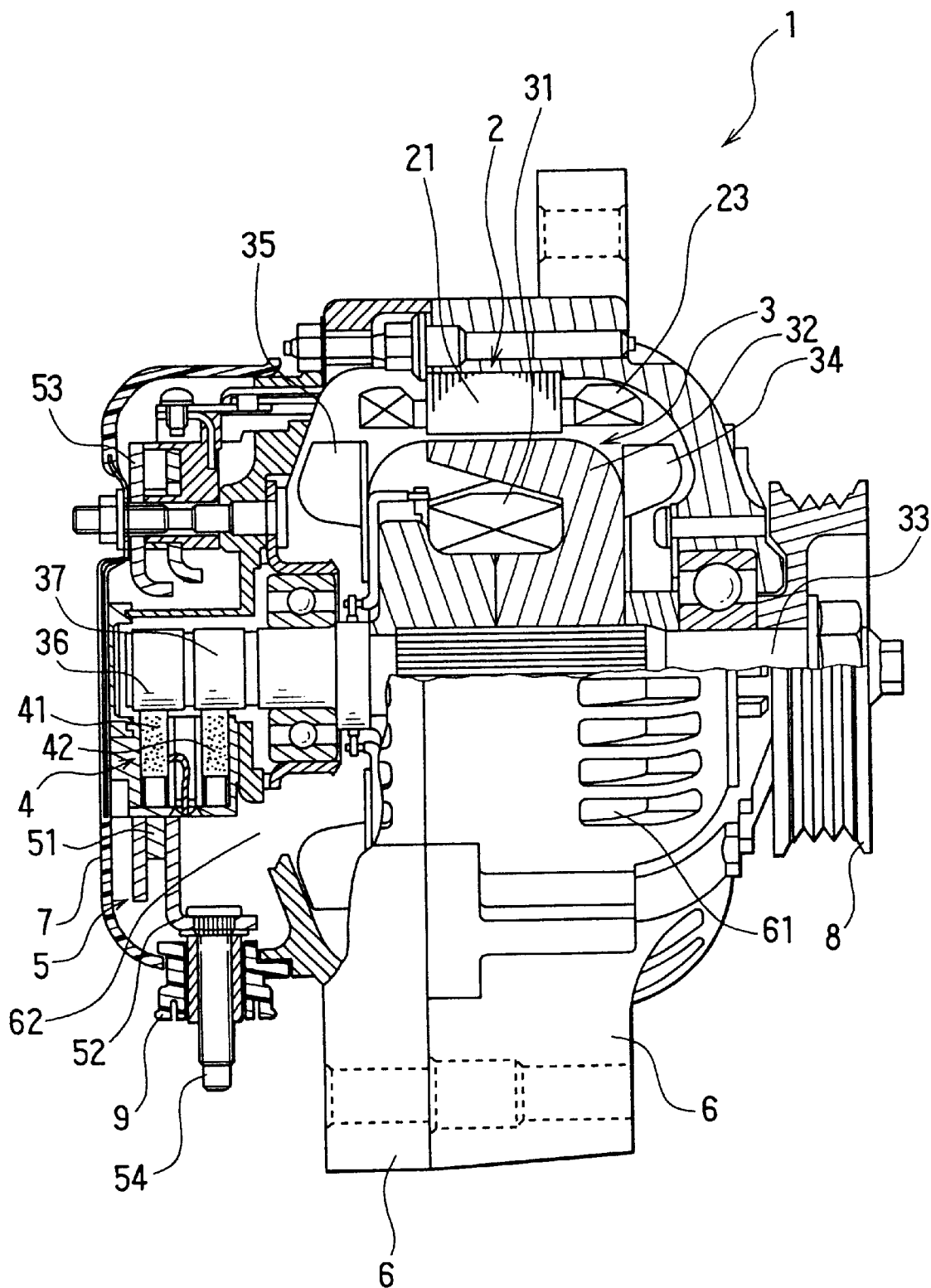
FIG. 1 is a sectional view of an alternating current generator according to an embodiment of the present invention.

Referring to FIG. 1, an alternating current generator (alternator) denoted by reference numeral 1 comprises a stator 2, a rotor 3, a brush device 4, a rectifier circuit 5, a pair of frames 6, a rear cover 7 made of resin, a pulley 8, and the like.

The stator 2 includes a stator core 21, three-phase stator windings 23 wound in a plurality of slots formed on the core 21 at a fixed interval.

The rotor 3 includes a pair of pole cores 32 each having six nail-shaped pole pieces and a field winding 31 wound cylindrically. The rotor 3 is firmly fitted around an output shaft 33, so that the pole cores 32 sandwich the field winding 31 in the axial direction and the pole pieces surround the field winding 31 from both axial sides of the pole cores 32. An axial flow type cooling fan 34 is fixed to the end surface of the pole core 32 located at the front side, so that air sucked from the front side may be blown in both axial and radial directions. A radial or centrifugal flow type cooling fan 35 is fixed to the end surface of the pole core 32 located at the rear side, so that air sucked from the rear side is blown in the radial direction.

The brush device 4 is provided to supply electric field current from the rectifier circuit 5 to the field winding 31 of the rotor 3 through its slip rings 36, 37 fitted on the output shaft 33 and its brushes 41, 42 held in sliding contact with the slip rings 36, 37.

The rectifier circuit 5 is provided between the rear side frame 6 and the rear cover 7 to produce direct current output power by rectifying alternating current voltages generated by the three-phase stator windings 23. The rectifier circuit 5 includes a terminal base plate 51 having electrical wiring electrodes thereon, a positive pole side heat radiation fin 52 mounting three rectifier diodes thereon, a negative pole side heat radiation fin 53 mounting three rectifier diodes thereon, and an electrical power output terminal 54 attached to the positive pole side heat radiation fin 52. This output terminal 54 is connectable to a storage battery (not shown) for charging. A total of six diodes mounted on the heat radiation fins 52, 53 are connected to full-wave rectify the generated three-phase alternating current voltages. A resin bushing 9 is fitted around the output terminal 54 as a protective member for electrical insulation.

The frames 6 are generally cup-shaped to house the stator 2 and the rotor 3 therein. The frames 6 support the rotor 3 rotatably through the output shaft 33. The stator 2 is fixed to the inner peripheral surface of the front side frame 6. The front side frame 6 has a plurality of openings 61 at positions radially outside the stator windings 23 protruding from the core 21 in the axial direction for discharging the cooling air therethrough. The rear side frame 6 has a plurality of openings 62 in its rearmost end for sucking the cooling air.

The rear cover 7 is attached to the rear side frame 6 to cover the brush device 4, the rectifier circuit 5 and an IC regulator (not shown), which are provided outside the rear side frame 6. The rear cover 7 is made of resin and has a reinforcing iron plate inserted partly therein.

In the above alternator 1, the rotor 3 rotates in response to the rotating force transmitted from an engine (not shown) to the pulley 8 through a belt (not shown). The nail-shaped pole pieces of the pole core 32 are magnetized by the field current supplied to the field winding 31 of the rotor 3. As the rotor 3 rotates, the stator windings 23 generate three-phase alternating current voltages in response to the rotating magnetic field. The three-phase voltages are full-wave rectified by the rectifier circuit 5, so that the resulting direct current output power is produced from the output terminal 54.

Figure 2:
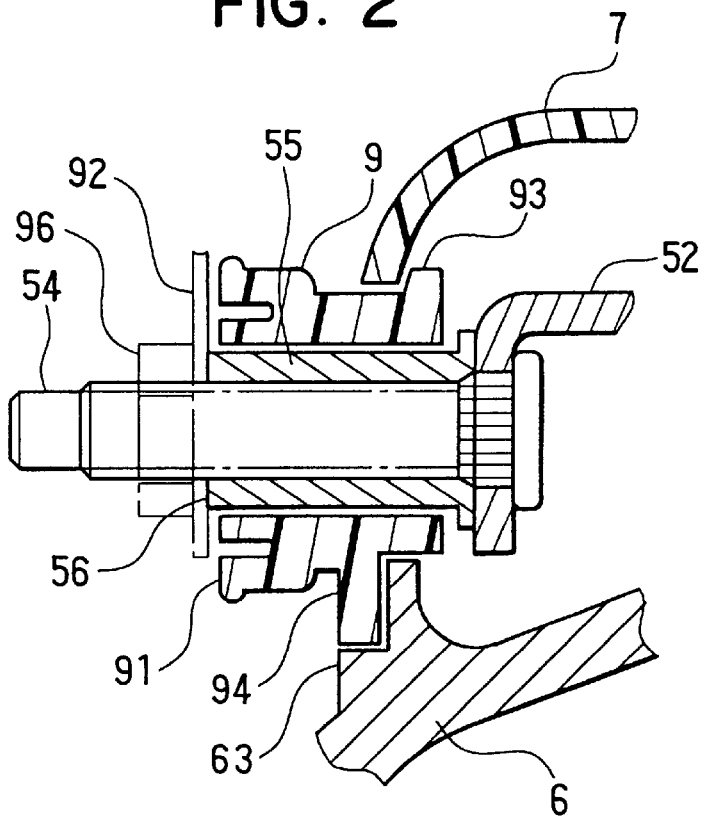
FIG. 2 is an enlarged sectional view of an assembly of output terminal, bushing and rear cover used in the embodiment.

As shown in FIG. 2, the output terminal 54 is knurled at its one end part. This knurled part is passed through a hole provided at the end part of the positive pole side heat radiation fin 52, and tightened to the fin 52 by a cylindrically-shaped metal nut 55. The nut 55 has an axial length longer than the corresponding length of the busing 9, so that one end face 56 of the nut 55 is located outside the end face 91 of the bushing 9 in the axial direction of the output terminal 54 when the bushing 9 is fitted around the output terminal 54. Thus, when an electrical output cable or lead 92 is fixed to the end face 56 of the nut 55 by a nut 96, only the metal nut 55 exists between the fin 52 and the output lead 92. As a result, the nut 96 is not loosened, while it is likely to be loosened when a resin member which contracts more is interposed.

Figure 3:
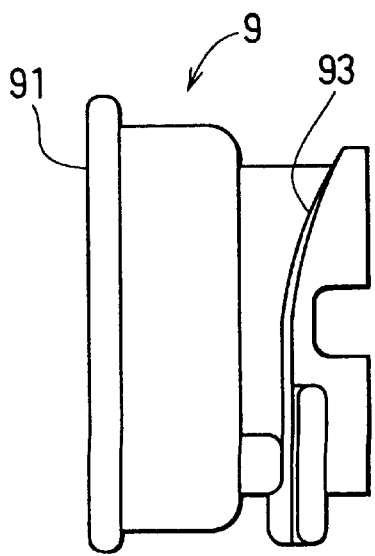
FIG. 3 is a side view of the bushing shown in FIG. 2.
Figure 4:
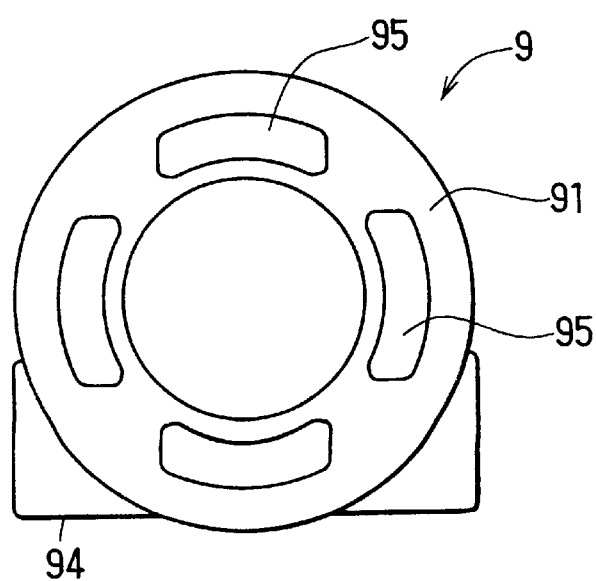
FIG. 4 is a front view of the bushing shown in FIG. 2.

The resin bushing 9 is generally in a cylindrical shape having a inner diameter substantially equal to the outer diameter of the nut 55. The bushing 9 has a flange 93 on a part of its outer periphery. The flange 93 is shaped to have a curved surface and be non-circular as shown in FIG. 3. The flange 93 has a flat or linear wall part 94, which faces the rear side frame 6, as shown in FIG. 4. The wall part 94 is engaged entirely or partly with the opposing linear wall surface of a restraining part 63 formed on the rear side frame 6, so that the bushing 9 is restrained from turning around the output shaft 54. This rotation restraining is advantageous in proper positioning, when the bushing 9 is formed with grooves 95 in the end face 91 as shown in FIG. 4 to fit the end parts of the output lead 92 in position for restricting the same from turning.

The bushing 9 may alternatively be formed with a curved or convex surface on a part of the flange 93 or on another outer surface other than the flange 93 in place of the linear wall part 94. The restraining part 63 may also be modified in shape to restrain the turning of the bushing.

Figure 5:
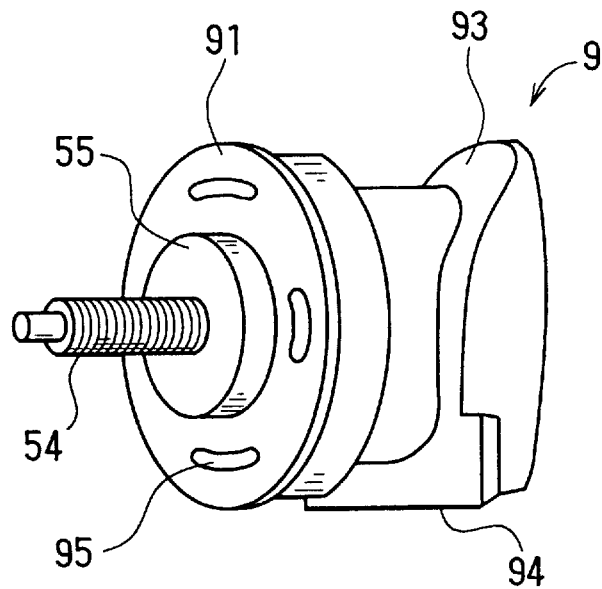
FIG. 5 is a perspective view showing the output terminal and the bushing fitted to each other.

The flange 93 formed on the outer peripheral surface of the bushing 9 has a surface inclined at an angle other than 90° relative to the axis of the output terminal 54 as shown in FIGS. 3 and 5. The rear cover 7 is engaged tightly with the bushing 9 with its inner surface being held in surface contact with the flange 93. Thus, the bushing 9 is restrained from turning around the output terminal 54 by the inclination of the surface of the flange 93. It is of course possible to restrain the bushing 9 from turning by only one of the linear wall part 94 of the flange 93 and the inclined surface of the flange 93. For instance, the bushing 9 is restrained from turning by the inclined surface of the flange 93 when the bushing 9 is positioned relatively away from the rear side frame 6, and by engaging a part of the outer periphery of the flange 93 with the restraining part 63 of the rear side frame 6 when the bushing 9 is positioned relatively close to the rear side frame 6.

Figure 6:
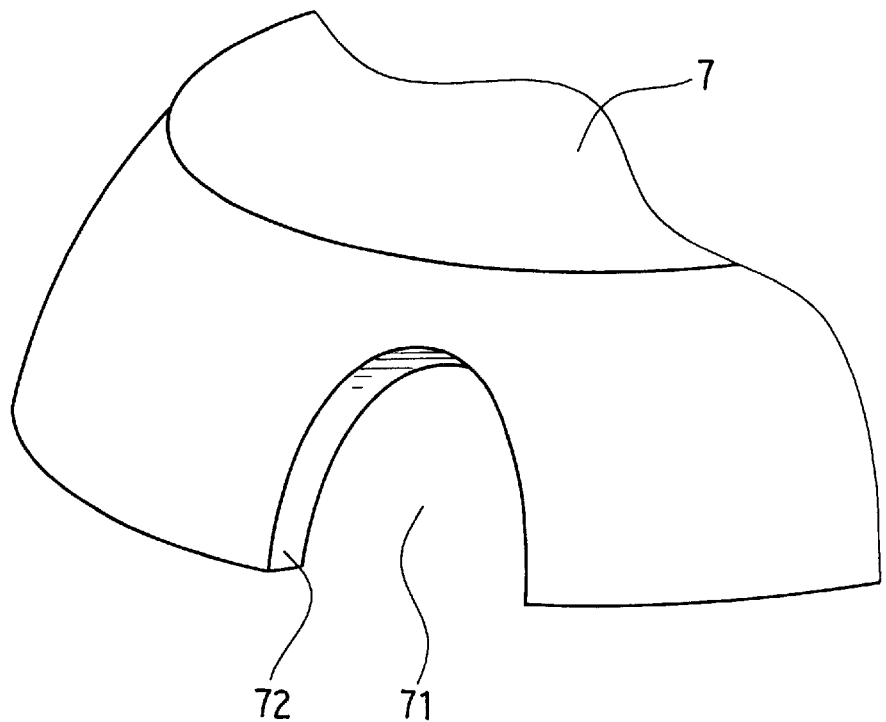
FIG. 6 is a perspective view of a part of the rear cover shown in FIG. 2.

The rear cover 7 has a recess 71 defined by an arcuate wall part 72 as shown in FIG. 6. This recess 71 is shaped to correspond to the outer configuration of the bushing 9. The rear cover 7 is attached to the rear side frame 6, so that the arcuate wall part 72 of the rear cover 7 is positioned at the outer side of the flange 93 of the bushing 9 to cover the flange 93. Thus, the bushing 9 is restricted from dropping off through the output terminal 54 in the axial direction of the output terminal 93. This is advantageous particularly when the output terminal 54 is fitted to extend in the downward direction as shown in FIG. 1.

In the above embodiment, the thickness of the arcuate wall part 72 which contacts the outer peripheral surface of the bushing 9 can be increased as needed to increase the contact area, because the rear cover 7 is made of resin. With the increased contact area, the pressing force per unit area is decreased correspondingly. As a result, when external force is exerted on the contact parts due to vibrations at the time of vehicle running, wear of the contact parts caused by friction can be reduced. As both of the bushing 9 and the rear cover 7 are made of resin to have generally the similar hardness, it is less likely that only one of the rear cover 7 and the bushing 9 wears excessively. It is also possible that the rear cover 7 is made of a metal such as aluminum and iron.

What is claimed is:

1. An alternator for vehicles comprising:

a frame supporting a rotary shaft therein;

a rectifier circuit, provided outside said frame, having an output terminal from which a generated electric output power is produced;

a protective member surrounding said output terminal for electrical insulation; and a rear cover, provided separately from said frame, to cover said rectifier circuit, wherein said rear cover is attached to a rear side of said frame to cover at least a part of said output terminal and fix said protective member between said frame and said rear cover.

2. An alternator as in claim 1, further comprising:

an output lead electrically connected to said output terminal; and a tightening member for tightening said output lead to said output terminal while maintaining said output lead not to press said protective member in a longitudinal direction of said protective member.

3. An alternator as in claim 1, wherein:

said protective member has an engagement part on an outer periphery thereof; and said engagement part is engaged with an edge part of said rear cover to fix said protective member in direct contact with said frame.

4. An alternator as in claim 1, wherein:

said rear cover is positioned to restrict said protective member from moving along said output terminal.

5. An alternator as in claim 1, wherein said rear cover is positioned to restrict the protective member from rotating around said output terminal.

6. An alternator as in claim 1, wherein said frame supports said rectifier circuit thereon and has a non-circular restraining part that engages a part of said protective member to restrain said protective member from rotating around said output terminal.

7. An alternator as in claim 1, wherein said rear cover and said protective member are made of resin.

8. An alternator as in claim 1, wherein said output terminal is provided to extend in a radial direction relative to a longitudinal direction of said rotary shaft;

said protective member is cylindrical and has a flange that is held in contact with said rear cover and restrained from moving along and round said output terminal.

9. The alternator according to claim 1, wherein said protective member has a first radially extending part located inside said rear cover, an a second radially extending part located outside said frame.

10. An alternator for vehicles comprising:

a frame supporting a rotary shaft therein;

a rectifier circuit, provided outside said frame, having an output terminal from which a generated electric output power is produced; and a protective member surrounding said output terminal for electrical insulation, said protective member has an engagement part, having a surface inclined at an angle other than 90° relative to a longitudinal axis of said output terminal and located on an outer periphery thereof, that engages said engagement part with an edge part of a rear cover to fix said protective member in direct contact with said frame, wherein said rear cover is provided separately from said frame to cover said rectifier circuit, said surface of said engagement part is positioned to face said rear cover, wherein said rear cover is attached to a rear side of said frame to cover at least a part of said output terminal and fix said protective member between said frame and said rear cover.

11. An alternator for vehicles comprising:

a frame supporting a rotary shaft therein;

a rectifier circuit, provided outside said frame, having an output terminal from which a generated electric output power is produced;

a protective member surrounding said output terminal for electrical insulation; and a rear cover, provided separately from said frame, to cover said rectifier circuit, wherein said rear cover is attached to a rear side of said frame to cover at least a part of said output terminal and fix said protective member between said frame and said rear cover;

an output lead electrically connected to said output terminal;

a first nut fitted around said output terminal between said output terminal and said protective member, said first nut having an axial length longer than that of said protective member; and a second nut fitted around said output terminal to press said output lead to said first nut while maintaining non-contact between said output lead and said protective member.

* * * * *